Feb. 22, 1966  V. G. M. CHATFIELD ETAL  3,236,499
DIFFERENTIAL PRESSURE CONTROL OF SEALING
FLUID FOR ROTARY FLUID MACHINES
Filed June 5, 1964  2 Sheets-Sheet 1

INVENTORS
V. G. M. CHATFIELD
F. KANGER
R. S. SPROULE

Fetherstonhaugh & Co.
ATTORNEYS

INVENTORS
V. G. M. CHATFIELD
F. KANGER
R. S. SPROULE

ATTORNEYS

United States Patent Office 3,236,499
Patented Feb. 22, 1966

3,236,499
DIFFERENTIAL PRESSURE CONTROL OF SEALING FLUID FOR ROTARY FLUID MACHINES
Victor G. M. Chatfield, La Salle, Quebec, Feodor Kanger, Cote St. Luc, Quebec, and Robert S. Sproule, Montreal, Quebec, Canada, assignors to Dominion Engineering Works Limited, Montreal, Quebec, Canada
Filed June 5, 1964, Ser. No. 372,996
13 Claims. (Cl. 253—26)

This invention relates to rotary fluid machinery such as pumps, turbines and pump turbines of the type which incorporate a shrouded impeller or runner and in which means are provided for reducing fluid friction on the impeller or runner by displacing the working fluid, in the spaces between the outside surfaces of the impeller or runner shrouds and the adjacent stator structure, with a second fluid which has both less density and less absolute viscosity than the corresponding properties of the working fluid.

When this invention is applied to a hydraulic turbine the working fluid will be water and an economical choice for the second fluid will be air.

In the following specification this invention will be described as embodied in an aerated vertical Francis hydraulic turbine, but it will be readily understood that any rotary fluid machine of the above mentioned type used in conjunction with a pair of fluids possessing the above mentioned relative characteristics will fall within the scope of this invention.

In co-pending United States continuation-in-part patent application Serial No. 201,881 filed June 12, 1962, now Patent No. 3,174,719, means are provided for reducing fluid friction in a Francis hydraulic turbine by introducing air into the spaces bounded by the runner shrouds and the adjacent stator structure, the air being maintained in the shroud spaces by space seals.

It was subsequently found that further improvement in efficiency could be obtained by reducing the quantity of air required for aeration. This improvement was obtained by reducing the leakage of air through the space seals by means of centrifugal air-water separation.

In co-pending United States patent application Serial No. 286,646, filed June 10, 1963, now Patent No. 3,174,720, and co-pending United States patent application Serial No. 326,608 filed Nov. 27, 1963, centrifugal separators were added to the band and crown space seals to provide air-water separation at the seals and more effectively maintain the air in the shroud spaces.

For effective operation the space seal centrifugal separator combination requires a continuous supply of sealing water, at a pressure determined by the turbine operating conditions, and this sealing water supply must be continuously regulated in quantity and pressure, thus demanding continuous supervision.

The need for continuous supervision of the sealing water supply provides many inherent disadvantages, all of which are overcome in the present invention by providing a means whereby the quantity and pressure of the sealing water supply to each space seal centrifugal separator combination is regulated automatically by sensing and measuring the difference in pressure across the centrifugal separator and using this pressure difference to initiate the regulation of the sealing water supply, when the pressure difference exceeds or falls below a predetermined value.

More specifically, pressure sensing lines are connected to the aerated shroud space and to the outer periphery of the centrifugal separator chamber. These pressure sensing lines are led to a pressure transmitter which measures the difference across the centrifugal separator and, if this difference exceeds or falls below a predetermined range of values then the pressure transistor signals to a pressure controller, which, in turn, varies the setting of a control valve positioned in the sealing water supply line to restore the pressure difference to within said predetermined pressure range.

In an alternative execution of this invention an additional pressure line is connected to the aerated shroud space and is positioned at a radius from the axis of turbine rotation, greater than that of the above noted shroud space pressure sensing connection. This additional connection, as will be fully described later, is used to initiate automatic aeration at machine start-up and also the re-establishment of aeration if an excess quantity of air is lost during turbine operation.

It will be understood that the aforementioned arrangement for automatic regulation can be applied to either band or crown seals, although in most embodiments of this invention space seal centrifugal separator combinations will be embodied in both band and crown seals.

It is, therefore, the main object of the present invention to provide, in a Francis type turbine, wherein fluid friction is reduced by maintaining the spaces between the outside surfaces of the runner shrouds and the adjacent structure filled with air, improved means for maintaining the air in these spaces, whereby sealing water is automatically regulated and supplied to the sealing means in the required quantity and at the required pressure.

Another object of the present invention is to provide, in a low specific speed Francis turbine, wherein fluid friction is reduced by maintaining the spaces between the outside surfaces of the runner shrouds and the adjacent stator structure filled with air and in which space seal centrifugal separator combinations are provided for effectively maintaining the air in said spaces, automatic means for sensing the differences in pressure across the centrifugal separators and for varying the quantity and pressure of sealing water supplied to the space seal centrifugal separator combinations when the differences in pressure exceed or fall below a predetermined range of values.

A further object of the present invention is to provide, in an aerated turbine of the type described, means to automatically initiate aeration, or to re-establish aeration, if air should be lost during turbine operation.

These and other objects and advantages of the present invention will be further apparent by referring to the following detailed specification and figures, in which—

Figure 1:
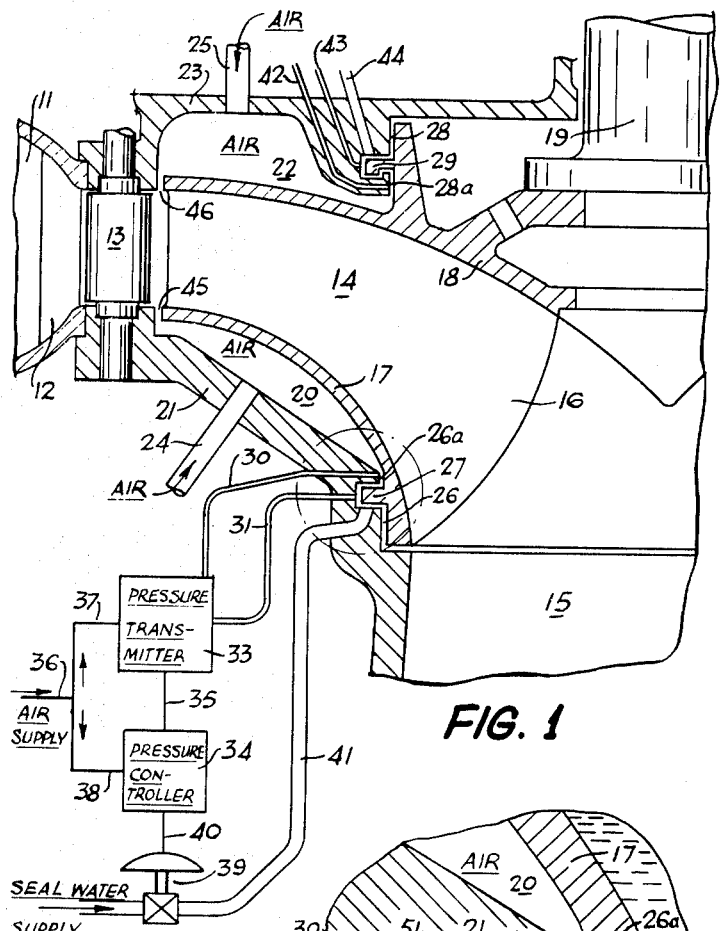
FIG. 1 is a fragmentary sectional view of a low specific speed Francis type turbine embodying the features of the present invention.

Referring now to the figures, wherein similar reference numerals designate corresponding parts throughout the several views, and with particular reference to FIG. 1, during the operation of this machine, water under pressure passes from the inlet casing 11 and is directed by stay vanes 12 and the wicket gates 13 to the runner, shown generally at 14, and is discharged at a reduced pressure into the draft tube 15.

Runner 14 comprises runner blades 16 connected together by band shroud 17 and crown shroud 18, and with shaft 19 connected to crown shroud 18.

Band shroud space 20 is formed between band shroud 17 and band stator 21, and crown shroud space 22 is formed between crown shroud 18 and crown stator 23.

Air under pressure is injected into band shroud space 20 and crown shroud space 22 through pipes 24 and 25, respectively, to provide the required reduction in fluid friction on the outside surfaces of band and crown shrouds 17 and 18, respectively.

A band space seal 26 is formed between the outside diameter of the lower portion of runner 14 and the inside diameter of the adjacent stator structure 21 and provides a close clearance annular seal. A further band space seal 26a is formed by the restricted annular space between the inner periphery of band stator 21 and the adjacent outside surface of band shroud 17. Band centrifugal separator 27 is positioned between band space seals 26 and 26a.

A crown space seal 28 is formed between the outside diameter of the upper portion of runner 14 and the inside diameter of the adjacent stator structure 23 and provides a close clearance annular seal. A further crown space seal 28a is formed by the restricted annular space between the inner periphery of crown stator 23 and the adjacent outside surface of crown shroud 18. Crown centrifugal separator 29 is positioned between crown space seals 28 and 28a.

Figure 2:
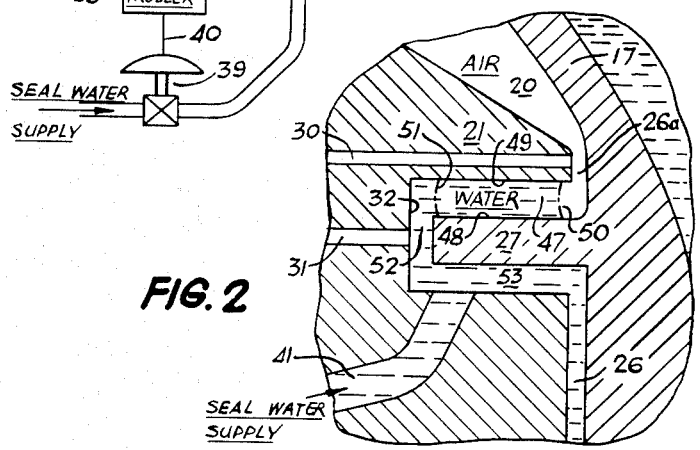
FIG. 2 is an enlarged sectional view of the band space seal centrifugal separator combination shown encircled in FIG. 1.

A pressure sensing line 30 is connected to band shroud space 20 and a pressure sensing line 31 is connected to the outer periphery 32 of the band centrifugal separator chamber, see FIG. 2. Pressure sensing lines 30 and 31 are connected to a pressure transmitter 33. An example of a pressure transmitter that is suitable for use in this installation is type ADV Differential Vector Pneumatic Transmitter manufactured by Republic Flow Meters Co., Chicago, Ill.

Pressure transmitter 33 is connected to a pressure controller 34 by means of connection 35. An example of a pressure controller that is suitable for use in this installation is type VC Pneumatic Controller manufactured by Republic Flow Meters Co., Chicago, Ill.

Pneumatic pressure supply line 36 divides into lines 37 and 38, line 37 supplying air under pressure to operate pressure transmitter 33 and line 38 supplying air under pressure to operate pressure controler 34.

Pressure controller 34 is connected to a pneumatically operated flow valve 39 by means of pneumatic connection 40.

Flow valve 39 is positioned in seal water supply line 41 to control the quantity and pressure of the seal water supplied to band space seal 26 and band centrifugal separator 27.

Crown space seal 28 and crown centrifugal separator 29 are supplied with seal water which is controlled in quantity and pressure in a manner similar to the supply of sealing water to the band space seal centrifugal separator combination. Thus pressure sensing lines 42 and 43 connected to crown shroud space 22 and the outer periphery of the chamber for crown centrifugal separator 29, respectively, are connected to a pressure transmitter, similar to pressure transmitter 33, which signals a pressure controller, similar to pressure controller 34, which, in turn, actuates a flow valve positioned in seal water supply line 44 to vary the quantity and pressure of the seal water to the crown space seal centrifugal separator combination.

The following description of the operation of the complete turbine is based on observations made during laboratory tests.

Consider runner 14 starting up from rest and running up to normal operating speed. With runner 14 at rest shroud spaces 20 and 22 are filled with water. As runner 14 starts to rotate it imparts a rotary motion to the water in the shroud spaces, thereby subjecting it to centrifugal force. Air under pressure is then injected, in limited quantity, into band shroud 20 through pipe 24 and crown shroud space 22 through pipe 25. Centrifugal separation takes place between the air and the water, due to the difference in densities, resulting in the accumulation of air in the regions of the shroud spaces closest to the axis of turbine rotation, while the water is displaced radially outwards. The continuing supply of air gradually fills band and crown shroud spaces 20 and 22, respectively, after which air escapes through the peripheral gaps 45 and 46 and is swept through runner 14.

The air, injected into the shroud spaces, is supplied from a suitable source at a pressure not less than the water pressure at the runner outer periphery and in controlled quantity sufficient to maintain the aerated spaces filled with air, plus a small leakage therefrom.

One example of a source of high pressure air, for injection into the shroud spaces, is a constant displacement compressor.

If the injection of air into shroud spaces 20 and 22 is delayed until runner 14 has reached a relatively high rotational speed, it may be necessary to purge the shroud spaces with a high initial flow of air, for a short period of time, in order to completely evacuate the spaces of water, as fully described in U.S. Patent No. 3,044,744.

Leakage of air from shroud spaces 20 and 22, inwardly through the space seals, is reduced to a minimum by centrifugal separators 27 and 29, respectively. Particular reference to FIG. 2 shows an enlarged view of band centrifugal separator 27, which is fully described in co-pending U.S. patent application Serial No. 286,646, and it will be understood that in the following brief description the action thereof will be similar to the action of crown centrifugal separator 29, which is fully described in co-pending U.S. patent application Serial No. 326,608.

Water trapped in radial space 47, between rotating surface 48 and stationary surface 49, is caused to rotate by the action of the fluid friction between the water and the rotating surface 48. This rotating ring of water establishes an air-water interface between surfaces 48 and 49, and, depending upon turbine operating conditions, the air-water interface will vary between positions 50 and 51. With a stabilized ring of water in radial space 47 providing an air-water interface between positions 50 and 51, the centrifugal separator is effective in minimizing the inward leakage of air from band shroud space 20.

A pressure gradient exists in the rotating ring of water, the pressure increasing radially outwards, and this gradient determines the pressure difference between the air in shroud space 20 and the water in annular space 52. Thus, the pressure of the water in annular space 52 will be equal to the pressure of the air in shroud space 20 plus the pressure produced by the pumping action of centrifugal separator 27. This condition represents the stable operating condition of the turbine and to maintain this balanced condition, wherein water is trapped in radial space 47, the pressure of the seal water flowing into space 53 must be maintained such that the air-water interface in space 47 is always between positions 50 and 51.

If the seal water pressure were not accurately controlled between predetermined limits, a too high seal water pressure would result in flooding of the shroud spaces and a too low seal water pressure would result in excessive inward air leakage through the space seals.

This balanced condition is achieved by transmitting signals of the pressure in band shroud space 20 and the pressure at the outer periphery 32 of the band centrifugal separator chamber through lines 30 and 31, respectively, to pressure transmitter 33.

Pressure transmitter 33 is essentially a chamber divided into two compartments by a flexible diaphragm and having the higher pressure line 31 connected to one compartment and the lower pressure line 30 connected to the other compartment. A predetermined pressure differential, not greater than the pumping head of the centrifugal separator when the air-water interface is in position 50 and not less than the pumping head of the centrifugal separator when the air-water interface is in position 51, maintains the diaphragm in a neutral position.

An increase or decrease in this pressure differential moves the flexible diaphragm which initiates a proportionate increase or decrease, respectively, in the output pressure to pressure controller 34.

Pressure controller 34 is essentially a device for amplifying the signal received from pressure transmitter 33, in order to pneumatically actuate flow vale 39.

Thus, an increase in pressure from pressure transmitter 33 to pressure controller 34, due to an increase in the pressure differential, results in an increased output pressure from pressure controller 34 to flow valve 39 which, in turn, reduces the flow of sealing water through the valve. This reduces the pressure of the sealing water supplied to annular space 52 and restores the pressure differential to within the predetermined range.

In a similar manner, a decrease in the pressure differential will produce a decrease in the output pressure from pressure controller 34 to flow valve 39, resulting in an increased flow through flow valve 39 and again restoring the pressure differential, to within the predetermined range.

It will be understood that pressure transmitter 33 and pressure controller 34, as described herein, are according to the preferred execution of this invention and that other suitable means for sensing a change in the pressure differential and using this change to initiate variations in the setting of a flow valve could equally well be used.

Figure 3:
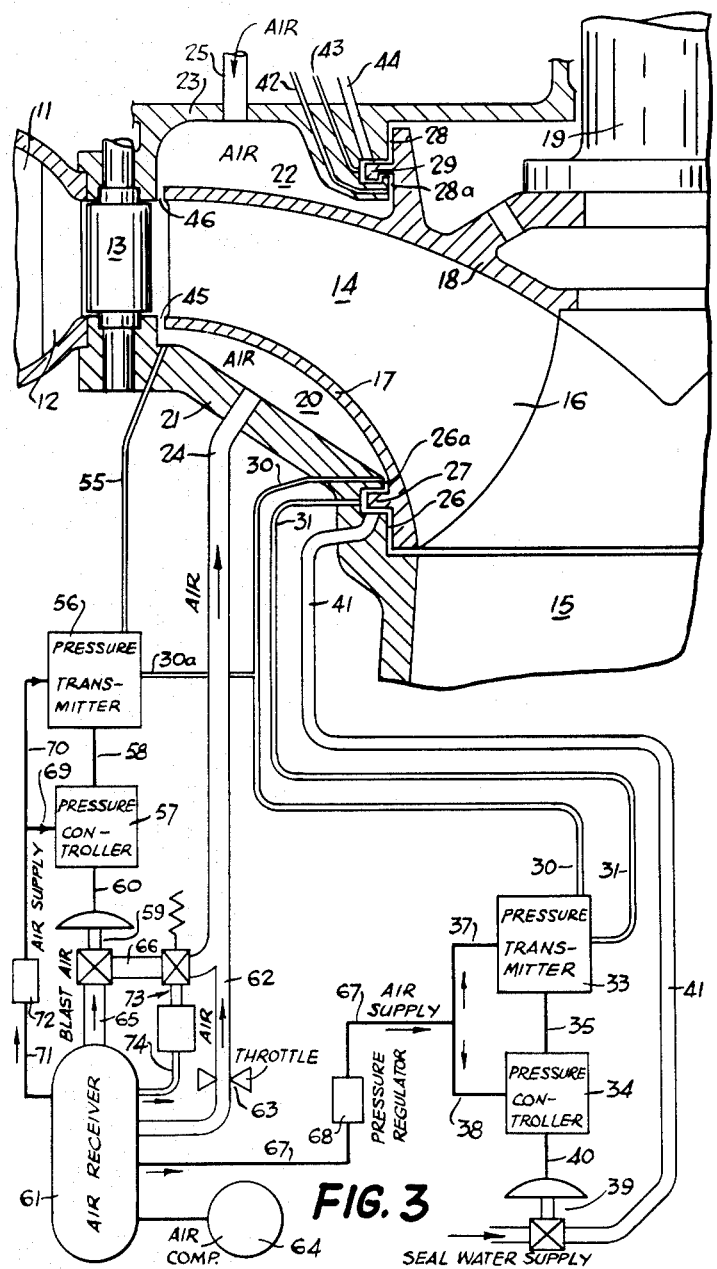
FIG. 3 is a fragmentary sectional view of a low specific speed Francis type turbine, similar to FIG. 1, but embodying an alternative execution of the present invention.

Reference now to FIG. 3 shows an alternative execution of this invention wherein the control circuit shown in FIG. 1 has been modified to incorporate automatic control means to initiate aeration at machine start-up, and also to re-establish aeration, if an excess quantity of air is lost during turbine operation.

A pressure sensing line 55 is connected to band shroud space 20 and positioned at a radius from the axis of turbine rotation greater than the radius from the axis of turbine rotation of pressure sensing line 30. In this alternative execution pressure sensing line 55 is shown positioned adjacent the outer periphery of shroud space 20. A pressure sensing branch line 30a is connected into pressure sensing line 30, and pressure sensing lines 30a and 55 are connected to a pressure transmitter 56. Pressure transmitter 56, which is similar to pressure transmitter 33, is connected to pressure controller 57 by means of connection 58, and pressure controller 57, which is similar to pressure controller 34, is connected to a pneumatically operated flow valve 59 by means of connection 60.

In this alternative execution, the continuing supply of air to shroud space 20 is provided by air receiver 61 through pipes 24 and 62, and is controlled in quantity by throttle 63, positioned in pipe 62. The pressure of air in air receiver 61 is maintained by air compressor 64.

Flow valve 59 is positioned between pipes 65 and 66 to permit a flow of air, at a very high rate and for a short period of time, through pipes 65, 66 and 24, into shroud space 20.

Air, under pressure, is supplied from air receiver 61 to lines 37 and 38 for operation of pressure transmitter 33 and pressure controller 34, respectively, through line 67 and pressure regulator 68, positioned therein.

Air, under pressure, is supplied from air receiver 61 to lines 69 and 70 for operation of pressure transmitter 56 and pressure controller 57, respectively, through line 71 and pressure controller 72, positioned therein.

When the turbine is in operation and shroud space 20 is aerated, the pressure differential between pressure sensing lines 55 and 30, due to their relative locations, is practically zero. If, under extreme conditions of operation, an excess quantity of air is lost from shroud space 20, water will enter shroud space 20 and accumulate in the region remote from the axis of turbine rotation due to the centrifugal separation of air and water. The pressure in pressure sensing line 30 will thus decrease and provide a pressure differential between pressure sensing lines 55 and 30.

This pressure differential will be measured by pressure transmitter 56 and, at a predetermined pressure differential, pressure controller 57 will open flow valve 59, permitting a blast of air to flow from air receiver 61, through lines 65, 66 and 24, to purge and evacuate shroud space 20 of water, in the manner described in U.S. Patent 3,044,744.

Control valve 73 is a piston and cylinder operated valve positioned in line 66 to prevent discharge of air from air receiver 61, through pipes 65, 66 and 24 to purge shroud space 20, until the air pressure in air receiver 61 reaches the required value. Line 74 supplies control valve 73 with air at the pressure in air receiver 61.

It will thus be seen that, when a predetermined pressure differential exists between pressure sensing lines 30 and 55, as at machine start-up, or when an excess quantity of air is lost from shroud space 20 during turbine operation, control valve 59 will automatically open and permit a flow of air, at a high rate of flow and for a short period of time, to purge the shroud space and establish, or restore, aeration therein.

The foregoing description for automatic initiation and restoration of band shroud space aeration will also be applied, in a similar manner, for initiation and restoration of crown shroud space aeration.

It will also be understood that, although this invention has been described as embodied in a vertical Francis type hydraulic turbine, it could equally well be applied to pumps and other hydraulic machines of the type previously set forth.

From the foregoing it will be seen that the present invention provides a new and improved means for accomplishing all of the objects and advantages as set forth.

What we claim is:

1. In a rotary hydraulic machine including a shrouded rotor having peripheral portions of different diameters, a stator structure enclosing the rotor and having a water inlet through which water is delivered to the rotor and a water outlet through which water passes from the rotor, the outer surface of said shrouded rotor being spaced from opposing walls of the stator structure to provide a circumferentially extending shroud space between the rotor and the stator structure, means for introducing air under preessure into said shroud space to reduce fluid friction on said rotor, centrifugal separation means positioned adjacent the peripheral edge of said shroud space nearest the axis of the rotor to minimize leakage of air from said shroud space, and means for supplying sealing fluid to said centrifugal separation means, automatic means functioning in response to variations in the pressure differential between the air pressure in said shroud space and the fluid pressure in said centrifugal separation means to vary the pressure of the supply of said sealing fluid to said centrifugal separation means to maintain said pressure differential between predetermined values.

2. In a rotary hydraulic machine including a shrouded rotor having peripheral portions of different diameters, a stator structure enclosing the rotor and having a water inlet through which water is delivered to the rotor and a water outlet through which water passes from the rotor, the outer surfaces of said shrouded rotor being spaced from opposing walls of the stator structure to provide circumferentially extending shroud spaces between the rotor and the stator structure, means for introducing air under pressure into said shroud spaces to reduce fluid friction on said rotor, centrifugal separation means positioned adjacent the peripheral edges of said shroud spaces nearest the axis of the rotor to minimize leakage of air from said shroud spaces, and means for supplying sealing fluid to said centrifugal separation means, automatic means functioning in response to variations in the pressure differentials between the air pressures in said shroud spaces and the fluid pressures in said centrifugal separation means to vary the pressures of the supplies of said sealing fluid to said centrifugal separation means to maintain said pressure differentials between predetermined values.

3. A rotary hydraulic machine as set forth in claim 1 including further automatic means functioning in response to a predetermined difference in pressure between shroud space locations, at different radii from the axis of the rotor, to permit an increased flow of air under pressure into said shroud space to substantially evacuate said space of water.

4. A rotary hydraulic machine as set forth in claim 3 in which said increased flow of air under pressure lasts for a relatively short period of time.

5. In a rotary hydraulic machine including a shrouded rotor having peripheral portions of different diameters, a stator structure enclosing the rotor and having a water inlet through which water is delivered to the rotor and a water outlet through which water passes from the rotor, the outer surfaces of said shrouded rotor being spaced from opposing walls of the stator structure to provide circumferentially extending shroud spaces between the rotor and the stator structure, means for introducing air under pressure into said shroud spaces to reduce fluid friction on said rotor, centrifugal separation means positioned adjacent the peripheral edges of said shroud spaces nearest the axis of the rotor to minimize leakage of air from said shroud spaces and each comprising a rotor element extending outwardly from said rotor and a stator element forming substantially an annular chamber around said rotor element, said rotor and stator elements shaped to provide opposing rotary and stationary surfaces lying in planes substantially perpendicular to the axis of the rotor, and means for supplying sealing fluid to said annular chambers, automatic means functioning in response to variations in the pressure differentials between the air pressures in said shroud spaces and the fluid pressures at the outer peripheries of said chambers to vary the pressures of the supplies of said sealing fluid to said chambers to maintain said pressure differentials between predetermined values.

6. A rotary hydraulic machine as set forth in claim 5 in which supply lines having flow valves positioned therein are provided for supplying said fluid to said annular chambers, and in which said automatic means includes means for automatically sensing variations in said pressure differentials and for varying the settings of said flow valves in response to said variations to maintain said pressure differentials between predetermined values.

7. A rotary hydraulic machine as set forth in claim 5 in which supply lines having flow valves positioned therein are provided for supplying said fluid to said annular chambers, and in which said automatic means includes pressure transmitter means for automatically sensing variations in said pressure differentials and emitting signals in response thereto, and pressure controller means for varying the settings of said flow valves in response to said signals from said pressure transmitter means to maintain said pressure differentials between predetermined values.

8. A rotary hydraulic machine as set forth in claim 5 including further automatic means functioning in response to predetermined differences in pressures between shroud space locations, at different radii from the axis of the rotor, to permit an increased flow of air under pressure into said shroud spaces to completely evacuate said spaces of water, and including air receiver means for supplying said increased flow of air under pressure.

9. A rotary hydraulic machine as set forth in claim 8 in which said further automatic means includes pressure transmitter means for sensing and measuring differences in pressures between shroud space locations and emitting signals in response thereto, and pressure controller means for actuating flow valve means, in response to said signals, to admit said increased flow of air to said shroud spaces.

10. A rotary hydraulic machine including a shrouded rotor having peripheral portions of different diameters, a stator structure enclosing the rotor and having a water inlet through which water is delivered to the rotor and a water outlet through which water passes from the rotor, the outer surfaces of said shrouded rotor being spaced from opposing walls of the stator structure to provide circumferentially extending shroud spaces between the rotor and the stator structure, means for introducing air under pressure into said shroud spaces to reduce fluid friction on said rotor, centrifugal separation means positioned adjacent the peripheral edges of said shroud spaces nearest the axis of the rotor to minimize leakage of air from said shroud spaces and each comprising a rotor element extending outwardly from said rotor and a stator element forming substantially an annular chamber around said rotor element, said rotor and stator elements shaped to provide opposing rotary and stationary surfaces lying in planes substantially perpendicular to the axis of the rotor, supply lines supplying sealing fluid to said annular chambers, said supply lines having flow valves positioned therein, pressure transmitter means having pressure sensing lines connected to said shroud spaces and to the outer peripheries of said chambers for sensing variations from predetermined pressure differentials between the pressure of the air in said shroud spaces and the fluid pressure at the outer peripheries of said chambers and automatically emitting signals in response to said variations, pressure controller means for varying the settings of said flow valves in response to said signals from said pressure transmitter means to automatically restore said pressure differentials to between said predetermined values.

11. A rotary hydraulic machine as set forth in claim 10 in which said pressure transmitter means, said pressure controller means and said flow valves are pneumatically operated.

12. A rotary hydraulic machine as set forth in claim 10 including further automatic means functioning in response to predetermined differences in pressures between shroud space locations, at different radii from the axis of the rotor, to permit an increased flow of air under pressure into said spaces to completely evacuate said spaces of water, and including air receiver means for supplying said increased flow of air under pressure, said further automatic means including pressure transmitter means for sensing and measuring differences in pressures between shroud space locations and emitting signals in response thereto, and pressure controller means for actuating flow valve means, in response to said signals, to admit said increased flow of air to said shroud spaces.

13. A rotary hydraulic machine as set forth in claim 12 in which said air receiver is also used to supply air to said shroud spaces to reduce fluid friction on said rotor.

No references cited.

SAMUEL LEVINE, *Primary Examiner.*